United States Patent

Cliff

[15] 3,651,340

[45] Mar. 21, 1972

[54] CURRENT LIMITING COMPLEMENTARY SYMMETRY MOS INVERTERS

[72] Inventor: Steven K. Cliff, Lancaster, Pa.

[73] Assignee: Hamilton Watch Company, Lancaster, Pa.

[22] Filed: June 22, 1970

[21] Appl. No.: 48,007

[52] U.S. Cl. ..............................307/251, 307/237, 307/288, 307/304, 307/313, 307/317

[51] Int. Cl. ..........................................H03k 17/60

[58] Field of Search .............307/205, 221 C, 237, 251, 255, 307/279, 288, 304, 313, 317

[56] References Cited

UNITED STATES PATENTS 3,533,087 10/1970 Zuk..................................307/279 X
3,260,863 7/1966 Burns et al..............................307/205
3,541,353 11/1970 Seelbach et al....................307/251 X
3,328,710 6/1967 Baldwin.............................307/313 X

OTHER PUBLICATIONS

Saffir, Getting More Speed From MOS, Electronics Feb. 17, 1969, pp. 106–112.

*Primary Examiner*—Stanley T. Krawczewicz
*Attorney*—Le Blanc & Shur

[57] ABSTRACT

Disclosed is a complementary symmetry MOS inverter having a current limiting resistor or diode. The instantaneous current occurring during switching when both transistors are "on" is limited to reduce the average current drawn by the inverter. This further reduces the already low power drain of the inverter.

5 Claims, 3 Drawing Figures

INVENTOR
STEVEN K. CLIFF

BY Le Blanc & Shur
ATTORNEYS

CURRENT LIMITING COMPLEMENTARY SYMMETRY MOS INVERTERS

This invention relates to current limiting and more particularly to an arrangement for substantially reducing the power drawn by the transistors in a complementary symmetry MOS inverter.

Complementary symmetry circuits are well known and are used in many situations involving transistors of different types connected in series to a power supply. With the advent of integrated circuits, increased interest has been shown in the complementary symmetry MOS inverter incorporating P- and N-channel insulated gate field effect transistors or MOS devices connected in series to a power supply. An important feature of this construction is that with the proper selection of integrated circuit components, the inverter can be constructed to draw a minimum of power since, when one transistor is "on," the other is "off" and in most instances the power drawn by the inverter is simply due to the leakage through one of the transistors.

While the normal or quiescent current drawn by a complementary symmetry MOS inverter is quite small, there is nevertheless during switching from one state of the inverter to the other an instantaneous period of time in the switching when both transistors are "on." During this short period of time, a relatively high current is drawn from the power supply since the "on" resistance of the transistors is quite low. As a result, the average power drawn by the inverter during switching operation is substantially higher than the quiescent power drain and is a function of the switching frequency at which the inverter is operated.

The present invention is directed to a simplified and yet highly effective current limiting arrangement for reducing the amount of power drain from the power supply in a complementary symmetry circuit and particularly a complementary symmetry MOS inverter. This is accomplished by including a current limiting resistor or diode connected in series with the power supply. The current limiting resistance acts to reduce power consumption by limiting the current flow during the short switching period in which both transistors of the inverter are conductive. The value of the current limiting resistance is chosen so that it is very much greater than the "on" resistance of the transistors but is very much less than the "off" resistance of the transistors.

It is therefore one object of the present invention to provide a complementary symmetry transistor circuit having reduced power consumption.

Another object of the present invention is to provide a complementary symmetry MOS transistor circuit which draws a reduced amount of power from a power supply.

Another object of the present invention is to provide a relatively simplified and inexpensive current limiting arrangement for complementary symmetry MOS transistor inverters.

Another object of the present invention is to provide a complementary symmetry MOS inverter circuit including a resistance in series with the power supply for limiting the current flow through the inverter during the short switching period in which both transistors are conductive.

These and further objects and advantages of the invention will be more apparent upon reference to the following specification, claims, and appended drawings, wherein:

Figure 1:
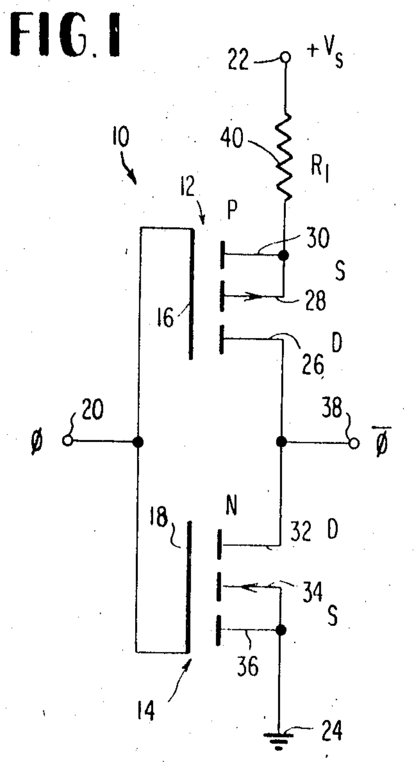
FIG. 1 is a circuit diagram of a complementary symmetry MOS inverter constructed in accordance with the present invention and incorporating current limiting.

Referring to the drawings, an inverter constructed in accordance with the present invention is generally indicated at 10 in FIG. 1. The inverter comprises a pair of transistors 12 and 14 having their respective gates 16 and 18 connected to a signal input terminal 20, the other side of the input being grounded.

A suitable power supply (not shown), such as a battery or the like, has its positive side connected to the positive power supply terminal 22 and its other side connected to ground 24 so as to apply a voltage $V_s$ across transistors 12 and 14. Transistor 12 includes a drain 26 and a source 28 connected in common with the base or substrate 30 of the transistor. Similarly, transistor 14 comprises a drain 32 and a source 34 connected in common with the transistor base or substrate 36. An output terminal 38 is connected to the two transistor drains 26 and 32 and an output signal is developed between output terminal 38 and ground. Transistor 12 is a P-channel insulated gate field effect transistor and transistor 14 is a complementary N-channel insulated gate field effect transistor or MOS.

When a voltage of $+V_s$ (logical "1") is applied to input terminal 20 of the inverter, the N-channel transistor 14 is turned on and the P-channel transistor 12 is turned off. The output at output terminal 38 is then at the low state or logical "0." When a voltage of zero value (logical "0") is applied to the input terminal 20 of the inverter, the P-channel transistor 12 is turned on and the N-channel transistor 14 is turned off. The resulting output $\bar{V}$ at output terminal 38 is $+V_s$ or a logical "1."

Since in either state of a logical "1" or logical "0" one transistor is "off" and the other is "on," the quiescent current is equal to the leakage current of the "off" transistor. The transient current is that current which is drawn during switching time of the P-channel and the N-channel transistors. During an instantaneous period of time in switching, when both transistors are "on," a relatively high current is drawn since the "on" resistance is low. In order to limit this instantaneous current, the inverter 10 of FIG. 1 is provided with a resistor 40, labeled $R_1$, connected between the source 30 of transistor 12 and the positive side of the power supply, i.e., power supply terminal 22. The limitation in the instantaneous current through the inverter due to resistor 40 reduces the overall average current drawn by the inverter. Resistor 40 may vary between relatively wide limits depending upon the switching frequency and the other parameters of the circuit. In general, the resistance of resistor 40 must be much greater than the "on" resistance of the transistors 12 or 14, but it must be very much less than the "off" resistance of the transistors. By way of example only, resistor 40 may vary in the neighborhood of from about 100 ohms to 1 megohm.

Figure 2:
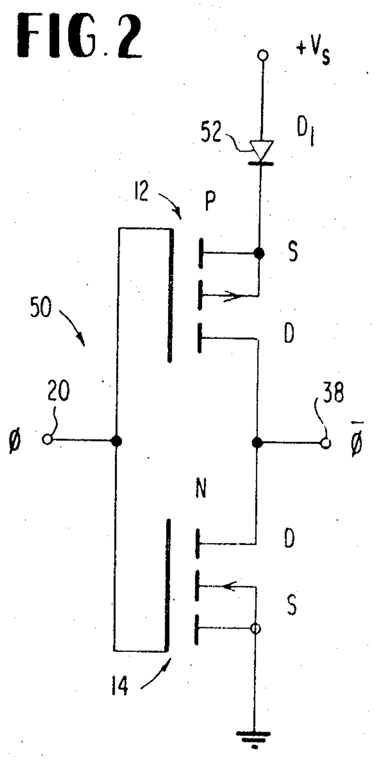
FIG. 2 is a circuit diagram similar to that of FIG. 1 showing a modified complementary symmetry MOS inverter incorporating a diode as the current limiting element.

FIG. 2 shows a modified inverter 50 in all respects identical to the inverter 10 of FIG. 1 with the exception that the resistor 40 of FIG. 1 has been replaced by a diode 52, labeled $D_1$. In this case, the forward resistance of diode 52 acts as the current limiting resistance in the circuit and should have the values given for the resistor 40 of FIG. 1.

Figure 3:
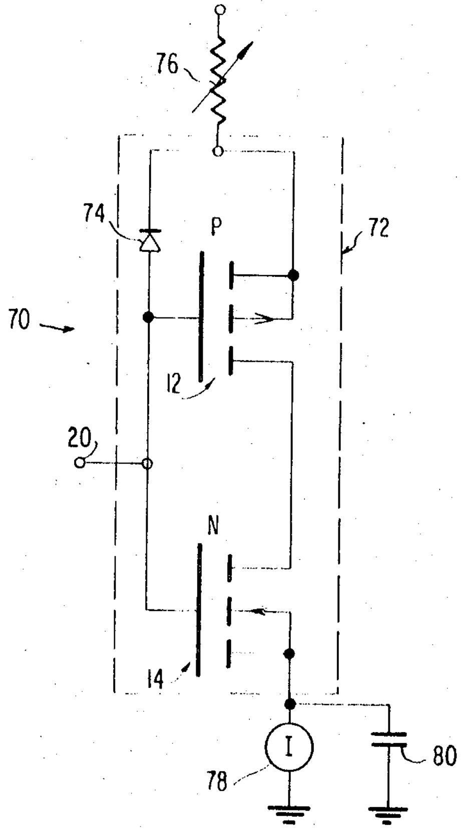
FIG. 3 is a circuit diagram of a test arrangement showing the relationship between current through the inverter and current limiting resistance.

FIG. 3 shows a test circuit arrangement for plotting the current through the inverter as a function of current limiting resistance. The inverter 70, illustrated in FIG. 3, was an integrated circuit inverter identified as RCA integrated circuit type TA5388. The elements formed by the integrated circuit are indicated by the dashed box 72 and include an internal diode 74 and two additional inverters which are not shown in FIG. 3. Connected to the inverter is an external variable resistor 76 which acts as a current limiting resistor and an ammeter 78 shunted by capacitor 80. Below in Table I there is shown a set of figures for the current flow through meter 78 in response to various resistance values of variable resistor 76.

TABLE I

| I (μa.) | R |
|---|---|
| 74 | 0 |
| 40 | 100Ω |
| 27 | 220Ω |
| 20 | 330Ω |
| 15 | 470Ω |

| | |
|---|---|
| 11 | 680Ω |
| 9.2 | 820Ω |
| 7.4 | 1000Ω |
| 3.8 | 2200Ω |
| 2.6 | 3300Ω |
| 2.2 | 4700Ω |
| 1.6 | 7500Ω |
| 1.38 | 10000Ω |
| 1.04 | 22000Ω |

The values in Table I are for a switching frequency of 1 kHz. with a power supply voltage $V_s$ of 10 V. and an input signal which varied between 0 and 10 V. As can be seen from Table I, for an increase in current limiting resistance from 0 to 22,000Ω, the average current I through meter 78 dropped from 74**a. to approximately 1.04 μa.

As the switching frequency is increased, the average current through the inverter becomes higher. This is shown in Table II below, which is similar to Table I in that it shows variations in current flow through ammeter 78 of FIG. 3 for various values of resistance for the variable resistor 76 of that figure. The values given in Table II are similarly for a supply voltage $V_s$ of 10 V. and a signal applied to input terminal 20 which varies between 0 and 10 V. However, the values in Table II are for an input signal which varies at a frequency of 100 kHz., i.e., 100 times the frequency of the figures shown in Table I.

TABLE II

| I (μa.) | R (external) |
|---|---|
| 105.5 | 0Ω |
| | 100Ω |
| 100 | 220Ω |
| 98 | 330Ω |
| 94 | 470Ω |
| 90 | 680Ω |
| 88 | 820Ω |
| 86 | 1000Ω |
| 82 | 2.2K |
| 81 | 3.3K |
| 80 | 4.7K |
| 80 | 7.5K |
| 79 | 10K |
| 72 | 22K |
| 65 | 33K |
| 58 | 47K |
| 50 | 68K |
| 43 | 100K |
| 31.5 | 220K |
| 22.8 | 680K |
| 21.5 | 1 meg. |

It is apparent from the above that the present invention provides an improved and simplified arrangement for enhancing the already low power drain of a complementary symmetry MOS transistor circuit. While particularly adapted for MOS transistors, the system of the present invention may be used in bipolar transistor constructions where low power drain may be desirable.

Important features of the present invention include the incorporation of a resistor or the forward resistance of a diode in series with a complementary symmetry MOS inverter which limits the current flow through the inverter during switching when both transistors are on and yet at the same time does not seriously affect the basic operation of the inverter circuit in switching between high and low output states in response to a changing input signal. The exact resistance placed in series with the power supply depends upon the frequency of operation and the other parameters of the circuit but, in general, may be in the range of between 100 ohms and 1 megohm. The system of the present invention is particularly adapted for use with integrated circuit components where the inverter is formed from an integrated circuit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A complementary symmetry inverter comprising a P-channel MOS and an N-channel MOS connected in series, said MOS's having their gates and drains connected in common, an input terminal coupled to said gates, an output terminal coupled to said drains, and an unbypassed current limiting resistance coupled in series with the source-drain circuits of said MOS's, said resistance having a value in the range of from 100 ohms to 1 megohm.

2. An inverter according to claim 1 including a pair of power supply terminals, said resistance being connected between the source of said P-channel MOS and the positive power supply terminal.

3. An inverter according to claim 2 wherein said MOS's are formed from an integrated circuit.

4. An inverter according to claim 3 wherein said current limiting resistance is formed by a resistor.

5. An inverter according to claim 3 wherein said current limiting resistance is formed by the forward resistance of a diode.

* * * * *

UNITED STATES PATENT OFFICE

CERTIFICATE OF CORRECTION

Patent No. 3,651,340 Dated March 21, 1972

Inventor(s) Steven K. Cliff

It is certified that error appears in the above-identified patent and that said Letters Patent are hereby corrected as shown below:

In Column 3, line 15, "74**a." should read --74$\mu$a--.

In Column 3, Table II, lines 31, 32, and 33,

| | |
|---|---|
| "105.5 | 0$\Omega$ |
| | 100$\Omega$ |
| 100 | 220$\Omega$" |

should read

| | |
|---|---|
| --105.5 | 0$\Omega$ |
| 102 | 100$\Omega$ |
| 100 | 220$\Omega$--. |

Signed and sealed this 1st day of August 1972.

(SEAL)
Attest:

EDWARD M.FLETCHER,JR.
Attesting Officer

ROBERT GOTTSCHALK
Commissioner of Patents